Jan. 14, 1969   R. E. HUMPHREYS   3,421,899
FISH BAIT AND METHOD OF MAKING THE SAME
Filed March 5, 1965

INVENTOR.
ROBERT E. HUMPHREYS.
BY
*Christy, Parmelee Strickland*
ATTORNEYS.

United States Patent Office 3,421,899
Patented Jan. 14, 1969

3,421,899
FISH BAIT AND METHOD OF MAKING THE SAME
Robert E. Humphreys, Franklin Township, Butler County, Pa., assignor to Angler Products, Inc., a corporation of Pennsylvania
Filed Mar. 5, 1965, Ser. No. 437,382
U.S. Cl. 99—3        8 Claims
Int. Cl. A23j 3/00; A01k 85/00

ABSTRACT OF THE DISCLOSURE

Edible fish bait formed from a homogeneous protein gel which has been combined with a hardening and toughening agent so that it will be retained on a hook, but by its slow solubility releases fish-attracting substances in the water.

---

This invention relates to fish bait and its manufacture, and is for an improved compound and product which is adapted for the manufacture of various bait forms that are presently produced from synthetic water-repellent plastics.

Artificial fish lures intended to simulate various natural forms, such as salmon eggs, earth worms and night crawlers, insects, butterflies, minnows, etc. are presently available. They are produced from synthetic plastic, usually water-repellent thermoplastics that lack the texture, feel or flavor of the natural creatures they are intended to represent. Being of an insoluble substance, they lack the important quality of natural bait because of their inability to leave a delicate trail of scent in the water.

The present invention utilizes a natural base comprised of protein which is appropriately hardened to hold a desired form and have the required toughness to stay on a hook for a sustained period of time, but which is nevertheless almost imperceptibly but gradually soluble so that a scent or flavoring ingredient in the bait will be released in minute quantities to produce the delicate trail of scent that is characteristic of natural bait. The bait desirably contains an opacifier to give it a desired appearance of translucence or render it completely opaque, and it contains coloring that may be either brilliant or just a light tint, as desired.

One bait that has been found particularly attractive, and hereinafter particularly illustrated and described, but without exclusion of other forms, is a salmon egg.

A principal object of my invention is to provide a formed bait having unique qualities.

A further object is to provide particularly a bait that simulates a salmon or other fish egg.

A still further object is to provide a new compound for use as a bait and a method of preparing a bait therefrom.

These and other objects and advantages are secured by my invention, which, in conjunction with the accompanying drawing, may be more fully understood.

Figure 1:
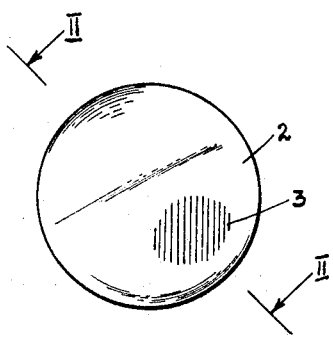
Figure 2:
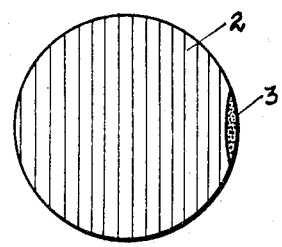

In the accompanying drawing:

FIG. 1 is an elevation, on an enlarged scale, of a salmon egg embodying my invention; and FIG. 2 is a section in the plane of line II—II of FIG. 1.

The principal ingredients of the bait are protein, which, with water, forms the gel that constitutes the body of the bait. A humectant is incorporated into the gel to retain the moisture in the bait and improve its texture. An opacifying material is used to produce the desired translucence or opacity, and there is employed a hardening agent which will enable the bait to set and hold its form and toughen the protein so that it has adequate strength to be retained on a hook, and which also constitutes a preservative.

Various coloring materials may be used, but preferably a water-soluble dye is used on the body of the bait. A water-dispersible pigment may be used on the surface. In the following example, dry commercial gelatin is used as the protein, water forms with the protein a gel, glycerine is the humectant, hexamethylene the hardener and toughener.

EXAMPLE

As an example, I employ the following:

| | |
|---|---|
| Gelatin | 5 grams. |
| Water | 50 grams. |
| Glycerine | 25 grams. |
| Hexamethylene-tetramine | 0.25 gram. |
| Suspendable titanium dioxide from a trace required to produce a slight cloudiness up to a quantity to provide a fully opaque body. | |
| Coloring | Vegetable dye as desired. |
| Scent or flavoring | Water-soluble extract—trace. |

These ingredients are prepared as follows:

The gelatin is mixed with cold water, preferably non-chlorinated water. To this solution the glycerine is added and the mixture is heated to about 180° F. for a short period of time, preferably about 10 to 15 minutes. Titanium dioxide is introduced into the mix either before or during heating until the desired opacity is achieved. For salmon eggs which have a cloudy translucence, very little is required, whereas a mix for a simulated frog or a tadpole would require a dense and more opaque quality. A salmon egg has a very pale salmon color through the body of the egg and the required amount of dye or water-soluble coloring may be introduced at this time, or subseqently.

Heating for a longer period of time will not harm the mix, because at this stage the pot life is indefinite, but after about 10 or 15 minutes at this temperature, the hexamethylene-tetramine is added and stirred into the mix. At this temperature this formulation has a pot life of about 30 minutes, but it may be lengthened by reducing the temperature.

The mixture in this condition may be charged into molds into various shapes and allowed to solidify. Upon solidification it may be removed from the molds and allowed to cure at ambient temperature for about 72 hours, when the bait may be used or packaged. The mold need be only an open cavity mold for the more simple shapes.

In the manufacture of imitation salmon eggs, the mix as prepared above is cooled to around 90° to 100° F., and measured small portions produced by using a metering pump as a feeder are dropped one after another into a bath of relatively viscous refrigerated non-ionic liquid such as refrigerated mineral oil at a temperature of about 32° F., which liquid is not a solvent for the bait compound. In slowly moving through this bath, the small masses assume a spherical shape, and they descend for a distance such that they will be cured to a point where they will permanently retain this shape. Upon removal from the forming bath, a dot of pigment is applied to the surface, this pigment being one that is not soluble, and which gives the appearance of the egg yolk, being a much denser and entirely opaque coloring, as distinguished from the pale lightly tinted translucent body. The formed "fish egg" is then cured at ambient temperature of around 70° F. for about 72 hours.

A particular method of and apparatus for forming the eggs is the subject of a copending application about to be filed.

The completed egg-like bait may range in size from about ¼ to ¾ of an inch. For shipment, storage and subsequent use, they are packed in containers, usually directly into containers of a size to be sold in the retail trade, as for example a glass jar about the size of a standard baby food jar, and the container is sealed with a replaceable cover. When so packed with a number of the eggs, the jar is filled with a liquid of an oily character which is not a solvent for the protein. This may be fish oil, or mineral oil to which a scent may or may not be added.

Various scenting preparations or extracts are available, including fish, cheese, musk, anise (which in small amounts is desirable for artificial earth-worms). These may be introduced into the mix before molding or shaping, or where the bait is packed in mineral oil, the scent may be introduced into this oil, from which it will be absorbed by the bait.

In the drawing, 2 designates the formed body which is a translucent, slightly tinted sphere. Applied to its surface is a small spot of pigment of about the same color, but dense and opaque. It is applied in a suitable vehicle, preferably a rapidly-vaporizable solvent. A paste-like pigmented printer's ink may be used. It only slightly penetrates the surface, as indicated in FIG. 2 at 3. However, it gives an appearance of a spherical globule inside a natural fish egg, especially when the bait is submerged in water.

The hexamethylene-tetramine reacts in a known manner with the protein to render it water-resistant, but not entirely insoluble, so that the bait will gradually dissolve, much in the way that the natural fish egg very slowly loses its substance, a quality sometimes referred to by fishermen as "milking" in the water, creating a taste and scent trail in the water. The protein so dissolved is recognized by fish as being of an edible material. Also the protein has a natural feel different from that of the more conventional plastics. It holds and releases the scent gradually.

The bait compound when molded into other forms has the same properties, but the natural salmon egg is a most difficult bait to simulate. The present invention is superior to actual fish eggs in that objectionable preservatives necessary to keep the natural eggs in usable condition are not necessary.

While I have described the materials I prefer to use, other protein than gelatin may be used, as for example animal glue, which is basically a crude gelatin from less select portions of animal carcasses. Casein may also be used, as could albumen. Hexamethylene-tetramine may be replaced by other reagents having a somewhat comparable effect, some of which are formaldehyde or other more complex aldehydes, chromic acid and chromic acid salts, as for example potassium di-chromate, and similar substances known as so-called waterproofing compounds for animal glue. Other humectants than glycerine may be used. Common ones in the food industry are propylene glycol and sorbitol. Opacifying agents other than titaniun dioxide may of course be used, these being mineral or inorganic compounds well known in the ceramic art, and even bentonite or other dispersible clays may be employed for this purpose, depending on the quality and density of the body to be formed.

While I have described certain procedures and particular bait forms and scents, it will be understood that various changes and modifications may be made within the spirit of my invention and under the scope of the appended claims.

I claim:

1. As a new article of manufacture, a preformed fish bait comprising a homogeneous gel comprising protein, water and a toughening and hardening compound, the bait being sufficiently tough to hold its form when penetrated by a hook, but slowly soluble in cold water, the protein being one selected from the group consisting of animal gelatin, animal glue and casein, the toughening compound being selected from the group consisting of hexamethylene-tetramine, formaldehyde, chromic acid and dichromate salts.

2. A fish bait as defined in claim 1 in which there is also a humectant comprising a compound selected from the group consisting of glycerine, propylene glycol and sorbitol.

3. A fish bait as defined in claim 2 in which the protein is animal gelatin, the toughening material is hexamethylene-tetramine, and the humectant is glycerine, and the ingredients are in the approximate proportions as follows:

| | |
|---|---|
| Gelatin | grams   5 |
| Water | do   50 |
| Glycerine | do   25 |
| Hexamethylene-tetramine | do   0.25 |
| TiO₂ | 0 to trace |
| Flavoring | 0 to trace |

4. The method of making an artificial fish bait comprising mixing and heating together a dried protein selected from the group consisting of animal gelatin, animal glue and casein, a humectant selected from the group consisting of glycerine, propylene glycol and sorbitol, a hardening and toughening agent comprising a compound selected from the group consisting of hexamethylene-tetramine, formaldehyde, chromic acid and dichromate salts and water to form a gel-forming solution, introducing into the solution a dispersible opacifying agent, shaping the mix into formed bodies of predetermined shape before it becomes firm, and curing the shaped bodies to retain their form.

5. The method of making a fish bait as defined in claim 4 in which the protein is animal gelatin, the humectant is glycerine, and the toughening and hardening agent is hexamethylene-tetramine, the ingredients being combined in about the following proportions:

| | |
|---|---|
| Gelatin | grams   5 |
| Water | do   50 |
| Glycerine | do   25 |
| Hexamethylene-tetramine | do   0.25 |
| TiO₂ | 0 to trace |
| Flavoring | 0 to trace |

6. The method of forming a fish bait comprising mixing water, gelatin and glycerine at a temperature above 100° F. and below 212° F. in proportions to provide a solution which upon cooling forms a gel, adding to the solution a hardening agent to render the gel firm and tough at ambient temperatures and which reduces its solubility in water, shaping the mixture into a body of predetermined shape before the mix has become firm, and finally curing the shaped mix at ambient temperature.

7. The method of making a fish bait as defined in claim 6 wherein an opacifying material is mixed into and dispersed through the hot solution of gelatin, water and glycerine.

8. The method of making a fish bait as defined in claim 7 wherein a coloring agent is also introduced into the heated liquid solution.

References Cited

UNITED STATES PATENTS

| | | | |
|---|---|---|---|
| 1,291,614 | 1/1919 | Noxon | 99—3 |
| 2,874,048 | 2/1959 | Walldov | 99—3 |
| 2,951,761 | 9/1960 | Stephan | 99—3 |
| 3,092,553 | 6/1963 | Fisher et al. | 99—134 X |

A. LOUIS MONACELL, *Primary Examiner.*

S. E. HEYMAN, *Assistant Examiner.*

U.S. Cl. X.R.

43—44.99